United States Patent [19]
Ash et al.

[11] Patent Number: 6,068,212
[45] Date of Patent: May 30, 2000

[54] AIRCRAFT STRUCTURE AND POWERPLANTS FOR USE THEREIN

[75] Inventors: Geoffrey J Ash, Lancashire; Matthew P Toolan, London, both of United Kingdom

[73] Assignee: British Aerospace Public Limited Company, Farnborough, United Kingdom

[21] Appl. No.: 08/992,101

[22] Filed: Dec. 17, 1997

[30] Foreign Application Priority Data

Dec. 18, 1996 [GB] United Kingdom .................... 9626231

[51] Int. Cl.[7] .................................................. B64D 27/00
[52] U.S. Cl. ............................................. 244/54; 60/39.31
[58] Field of Search ................................ 244/53 R, 54, 244/55; 60/39.31

[56] References Cited

U.S. PATENT DOCUMENTS

| | | | |
|---|---|---|---|
| 4,471,609 | 9/1984 | Porter et al. | 60/39.31 |
| 5,174,525 | 12/1992 | Schilling | 244/54 |
| 5,860,275 | 1/1999 | Newton et al. | 60/39.31 |
| 5,860,276 | 1/1999 | Newton | 60/39.31 |

FOREIGN PATENT DOCUMENTS

| | | |
|---|---|---|
| 737322 | 9/1955 | United Kingdom . |
| 1 540 654 | 2/1979 | United Kingdom . |
| 1540654 | 2/1979 | United Kingdom . |

*Primary Examiner*—Peter M. Poon
*Assistant Examiner*—Charles R. Ducker, Jr.
*Attorney, Agent, or Firm*—Nixon & Vanderhye P.C.

[57] ABSTRACT

The invention provides an aircraft incorporating a gas turbine engine powerplant wherein at least part of the powerplant forms a part of, or is integrated into, the airframe (i.e. the load-bearing structure of the aircraft) such that the powerplant is subjected to airframe loads (i.e. the main static or aerodynamic loads to which the aircraft is subjected, for example loadings due to the wings, the fin, etc.). A gas turbine powerplant comprising a carcass and a low pressure stage which are designed to be subjected to airframe loads is also discussed.

14 Claims, 7 Drawing Sheets

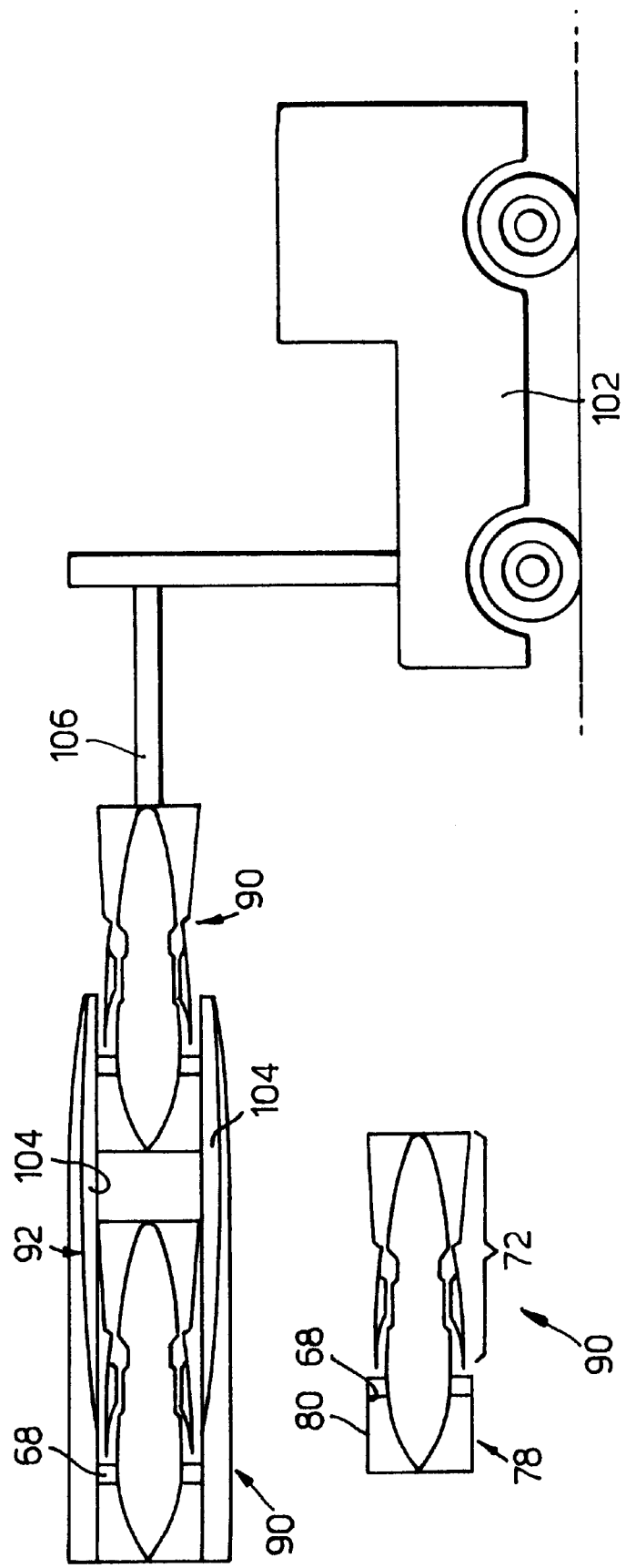

AIRCRAFT STRUCTURE AND POWERPLANTS FOR USE THEREIN

BACKGROUND OF THE INVENTION

1. Field of the Invention

This invention related to an improved structure for a gas turbine powered aircraft and to powerplants for use therein. In particular, but not exclusively, the invention relates to aircraft having a low bypass gas turbine engine mounted in the fuselage. However, the invention also extends to aircraft having wing-mounted and nacelle-mounted powerplants.

2. Discussion of Prior Art

In a conventional aircraft, the powerplant does not form part of the airframe of the aircraft. It is deliberately isolated from the main loads to which the aircraft is subject and which need to be transmitted and dissipated through the airframe structure. Such loadings include the loadings due to the wings, the fin, the taileron, the arrester hook etc. In conventional designs the airframe structure is designed to withstand these loads without transmitting them to the powerplant. The main loads to which the airframe is subjected are referred to hereinafter as the "airframe loads". Also, the term "airframe" is used in conventional manner to mean the load-bearing structure of the aircraft.

In a conventional design of aircraft with fuselage mounted powerplants, the airframe is designed to provide a bay into which the engine fits and the engine is typically attached to the airframe by a statically determinate mounting, i.e. a mounting which provides only one reaction force for each degree of freedom present within the system. This installation prevents airframe deflections from introducing loads into the powerplant, whilst allowing both axial and radial expansion of the engine due to thermal stressing during running.

Modern fighter aircraft are built according to his principle. The consequence of this is that, in the vicinity of the powerplant, most aircraft comprise a semi-monocoque construction consisting of an outer aircraft skin spaced from an inner aircraft skin by stringers or longerons to make up an airframe structure defining an engine bay. Within this engine bay is located the powerplant using a statically determinate mounting. Although this isolates the powerplant from the airframe loads, it is wasteful of space.

SUMMARY OF THE INVENTION

Accordingly, we have designed an arrangement in which the engine carcass is integrated into the airframe. We believe that this will allow a reduction in weight and/or cross-sectional area of the aircraft giving benefits in terms of an increase in performance and reduced drag.

Accordingly, in one aspect, this invention provides an aircraft including a gas turbine engine powerplant, wherein at least part of the powerplant forms a part of, or is integrated into, the airframe (as herein defined) of the aircraft.

In this arrangement, airframe loads may be transmitted to and through part of the powerplant and so this part of the powerplant becomes integrated into the airframe structure. Thus it is preferred to integrate part of the outer structure of the powerplant into the airframe of the aircraft. Where the gas turbine engine powerplant comprises a carcass means, a plurality or compressor stages, combustion means, and a plurality of turbine stages, the carcass means (or a part thereof) and the low pressure stage are preferably subjected to airframe loads. In this way, the carcass of the powerplant may replace many of the functions fulfilled by the inner aircraft skin in a conventional aircraft.

Preferably, he powerplant includes intermediate or core casing means surrounding one or more further compressor stages, and said intermediate or core casing is substantially isolated from airframe loads. The intermediate or core casing preferably extends further rearward to surround the combustion means and the plurality of turbine stages which also are substantially isolated from airframe loads.

The powerplant preferably includes structural support means (such as, for example, a spider means) for supporting the powerplant, said structural support means being arranged aft of the low pressure compressor stage and forward of any successive compressor stages.

This means that the core engine (comprising any successive compressor stages, the combustion means and the plurality of turbine stages and said intermediate casing) may be cantilevered from said structural support means. In this way, the airframe loads transmitted into the engine via said structural support means are not transmitted to the core engine. This means that the tip clearances downstream of the low pressure compressor stage should not be influenced by airframe loads. This is important because engine performance and efficiency is highly dependant on the tip clearance between the tip of the rotor blades and the inner surface of the casing at all the compressor and turbine stages. However, the effect on blade efficiency becomes greater as blade diameter reduces in the successive compressure stages and the turbine stages. Accordingly, in the present invention, only the low pressure stage is subject to airframe loads.

Preferably, the aircraft includes a structural frame (such as a "heavy" frame) secured to or integral with said structural support means, said structural frame supporting at least part of the aircraft fin and taileron loads.

The aircraft preferably includes a further structural fame secured to or integral with the powerplant carcass means downstream of said first mentioned structural frame.

Preferably, in the region of said powerplant means, the aircraft includes an outer skin means rigidly coupled to the powerplant carcass at a plurality of locations, whereby the carcass and the outer skin means define part of the airframe structure.

In a particularly preferred embodiment, the invention extends to an aircraft incorporating two multi-stage gas turbine powerplants arranged side-by-side in the fuselage, with each powerplant including a structural support means adjacent the aft end of the low pressure compressor, by which airframe loads may be transmitted through the forward part of the powerplants. The powerplants may also include a rearward structural support means connected to an aft part of the powerplant carcass, with the aft structural support means being interconnected by an aft structural frame means.

The forward and rearward structural frame means may be further stiffened by means of one or more elongate reinforcing members extending between the structural frame means. It is greatly preferred for the reinforcing means together to constitute an "I" section to provide improved bending and torsional resistance. The "I" beam may be made of a longitudinal keel and upper and lower bear means.

In another aspect, the aircraft is arranged such that the core engine and low pressure compressor stage can be withdrawn longitudinally from the powerplant carcass. In this arrangement, the inner profile of the engine carcass adjacent the low pressure compressor state is preferably generally cylindrical to allow rearward withdrawal of the compressor blades. Likewise, it is preferred for the low pressure compressor stators to be mounted on an annulus means removably secured to the airframe and which an be removed longitudinally with the remainder of the powerplant.

Preferably, the airframe structure adjacent the powerplant means includes longitudinal guide means such as runners for assisting withdrawal and replacement of the removed components of the powerplant.

The invention also extends to a powerplant for use in an aircraft as defined above.

The invention extends to a gas turbine powerplant comprising a carcass means, a plurality of compressor stages, combustion means and a plurality of turbine stages, wherein the carcass means and the low pressure compressor stage are designed to be subjected to airframe loads.

Preferably the powerplant includes intermediate casing means surrounding one or more further compressor stages and said intermediate casing is designed to be substantially isolated from airframe loads. The powerplant preferably includes structural support means for being connected in use to an airframe for supporting the powerplant, the structural support means being arranged aft of the low pressure compressor stage and forward of any successive compressor stages.

BRIEF DESCRIPTION OF THE DRAWINGS

Whilst the invention has been described above, it extends to any inventive combination of the features set out above or in the following description.

The invention may be performed in various ways and an embodiment thereof will now be described in detail, reference being made to the accompanying drawings, in which:

FIG. 8 is a schematic view showing removal of a core engine from an aircraft of this invention, and FIGS. 9(a) and (b) show the load path through the embodiment of the aircraft illustrated in FIG. 6, in side view and plan view respectively.

DETAILED DESCRIPTION OF PREFERRED EMBODIMENTS

Figure 1:
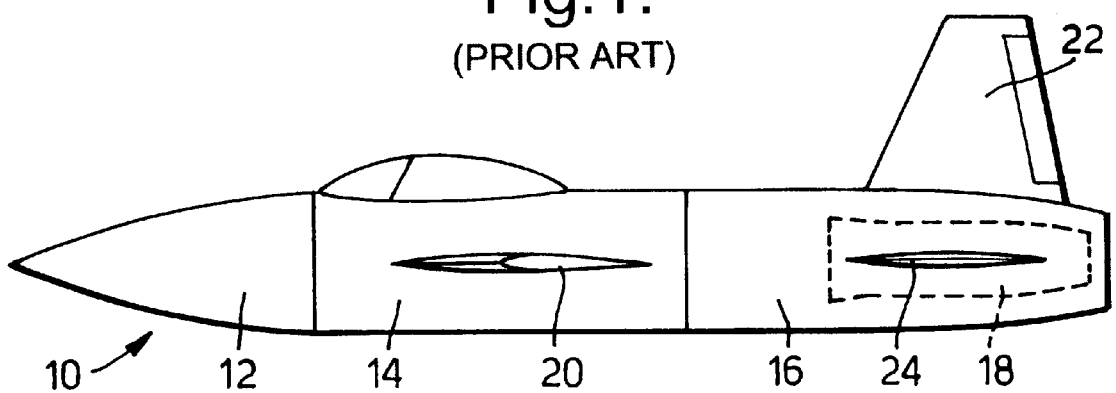
FIG. 1 is a schematic side view of a fighter aircraft showing the fuselage sections.

Referring initially to FIG. 1, a modern fighter aircraft 10 is typically made up of three fuselage sections namely the front centre and rear fuselage sections, 12, 14, 16. These fuselage sections make up the airframe and are designed to withstand the loads experienced during manoeuvring and to dissipate these loads throughout the airframe structure. In existing aircraft of this type, the powerplant 18 is mounted within the rear fuselage 16 in a statically determinate manner so that the powerplant (or powerplants) are not stressed. Any loads, due to the wings 20, fin 22, taileron 24 etc are transmitted through the airframe structure around the powerplant 18 and are not transmitted into the powerplant itself.

Figure 2:
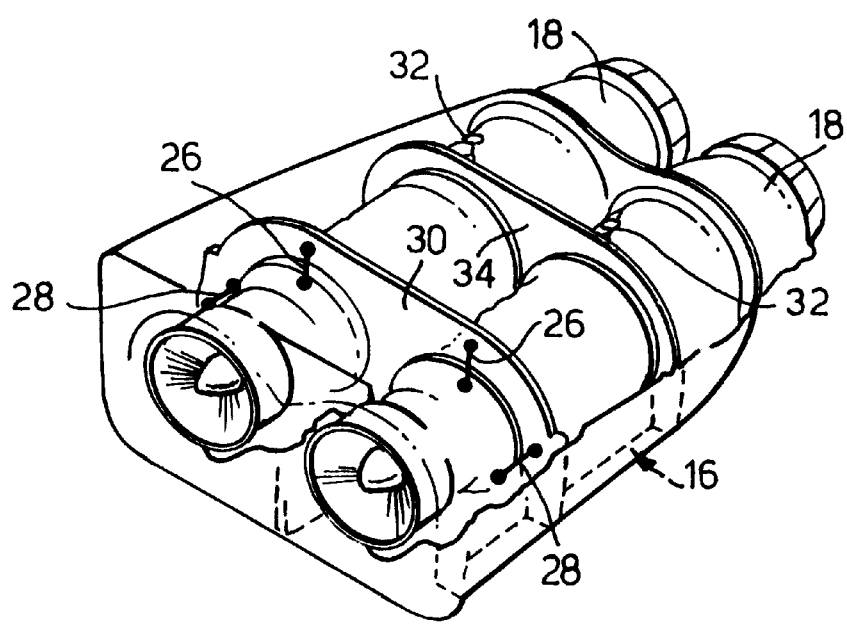
FIG. 2 is a schematic view of the powerplant installation of a known modern form of fighter aircraft.

Referring to FIG. 2, in a typical twin powerplant arrangement, two powerplants 18 are mounted side-by-side in the rear fuselage section 16. The mountings comprise a thrust spigot 26 and tie bars 28 connected to a front heavy frame 30, and a rear mounting 32 connected to a rear heavy frame 34.

Figure 3:
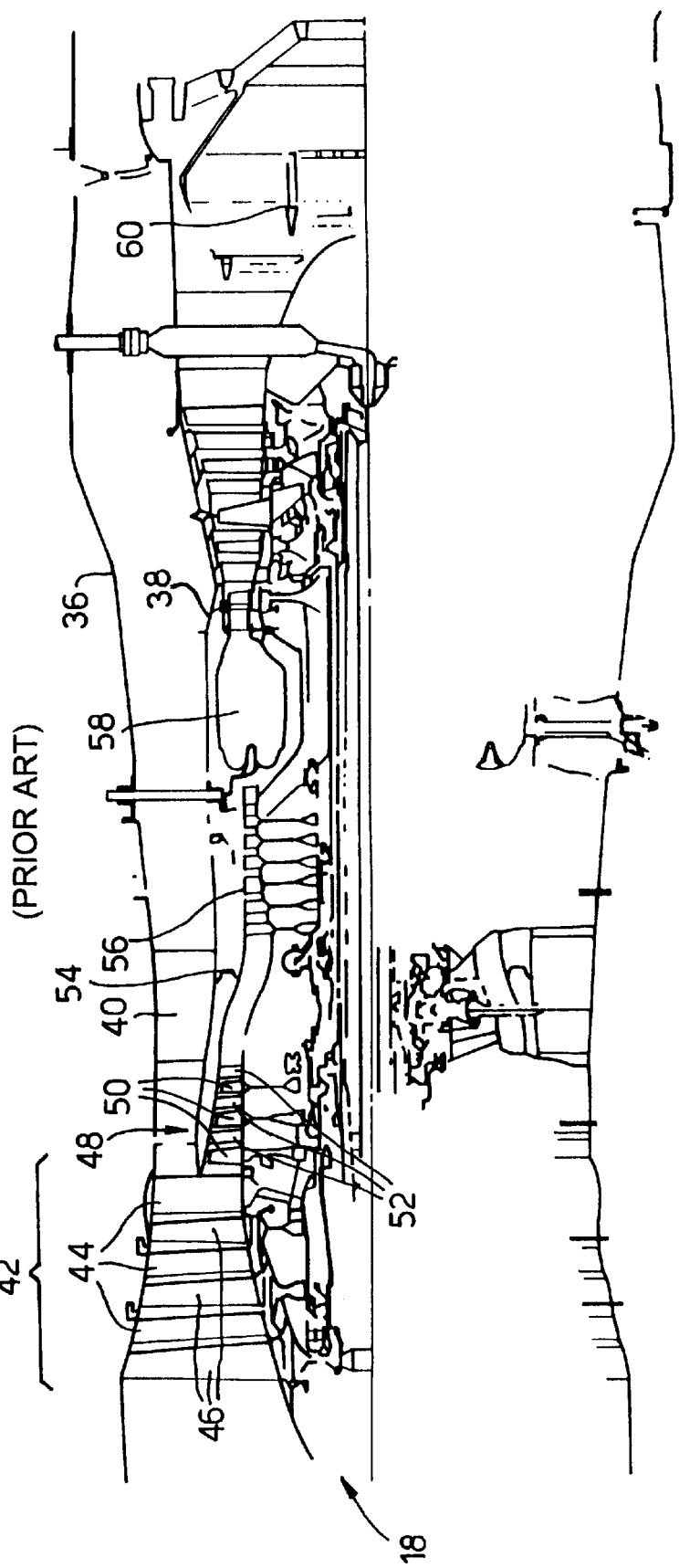
FIG. 3 is a schematic view of the core layout of a three spool gas turbine engine.

Referring to FIG. 3, an existing form of gas turbine powerplant 18 comprises an outer carcass or casing 36 within which the core engine 38 is mounted by means of a main structural item or spider 40. The powerplant comprises a low pressure compressor stage 42 made up of stators and rotor blades 44, 46 which compress air entering the compressor face and supply it to an intermediate pressure compressor 48 having stator and rotor blades 50, 52 disposed within an intermediate or core casing 54. This casing splits the flow and one component goes to the intermediate compressor whilst the other bypasses the remainder of the compressor and turbine stages to exit the aft end of the engine to be mixed with the hot core efflux. Downstream of the intermediate pressure compressor 48, the air passes through a high pressure compressor 56, and thence into a combustion chamber 58 into which fuel is introduced and burned, the hot gas is passed through three turbine stages. The design and operation of such engines is well known to those skilled in the art and will not be described in further detail here.

In the typical gas turbine engine, the core engine is supported by the spider 40 downstream of the intermediate pressure compressor 42. An afterburner rigging 60 is attached to the engine carcass 36.

In the various embodiments of the invention to be described below, in direct contrast to the above arrangement, airframe loads are dissipated to part of the powerplant and the powerplant therefore forms an integral part of the airframe structure. In arriving at this design we have determined that, by careful modification of the basic engine configuration, it is possible to provide an engine system which, whilst capable of transmitting airframe loads to the adjacent structure, still ensures that the major proportion of the engine sensitive stress is isolated from airframe loading.

Thus, we have designed an arrangement in which the core of the powerplant, that is all the part of the engine containing rotating machinery (i.e. not areas such as the bypass duct or jet pipe) downstream of the low pressure compressor, is unstressed, being cantilevered from the airframe.

One of the major reasons for not stressing the core of the engine is the problem of tip clearances. In order to produce as efficient an engine as possible, it is necessary to prevent flow over the tip of the rotating blade from the higher to the lower pressure side. The ideal solution would be to have a perfect interface between the blade and the confining annular casing with there being no gap whatsoever between the two. This is of course impossible to achieve in practice and so a clearance must be provided to allow for relative expansion or deflection of the engine parts. The maximum allowable tip clearance (at which there is an acceptably small degradation in performance) is therefore of vital concern. In practice the tip clearances are typically between 1 and 2% of the blade height. A further increase of tip clearance of 1% of blade height will typically reduce the efficiency of the engine by 1.5% and halve the surge margin. The tolerances in the engine become tighter and tighter as the blade height reduces and so we have decided to keep any large induced deflection of the case surrounding the rotating blades away from areas such as the high pressure turbine and compressor. We have therefore developed an engine configuration in which airframe loads may be introduced into the engine without significantly degrading engine performance.

Figure 4:
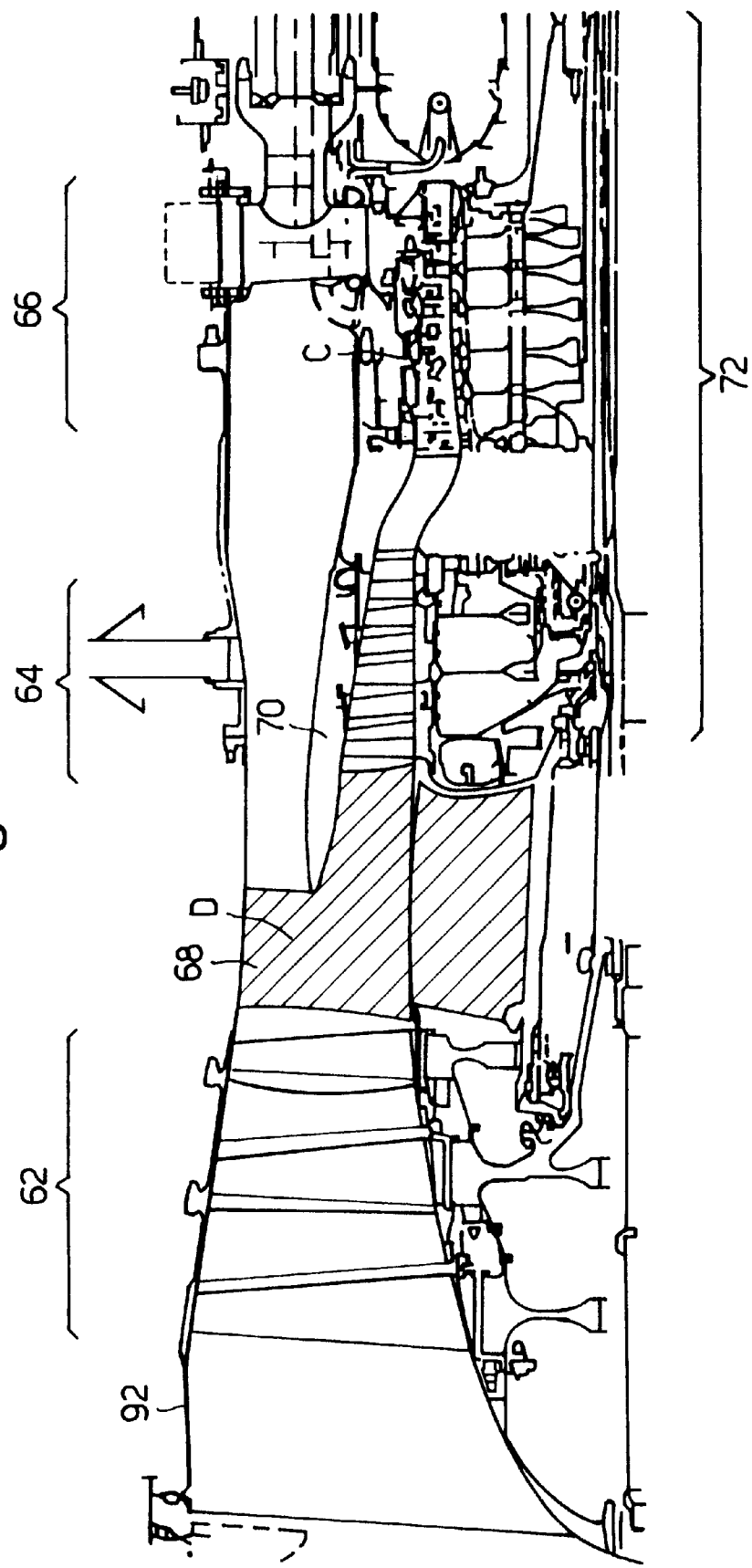
FIG. 4 is a schematic view of a gas turbine modified in accordance with this invention.

Referring now to FIG. 4, this shows the forward part of an engine modified in accordance with this invention. The engine as high, intermediate, and low compressor states 62, 64, 66 is made up of stators and rotors as in the existing engine. However, in the modified engine, the major structural component or spider 68 has been moved forwardly of the intermediate pressure compressor. The intermediate pressure compressor 64 has been moved rearwards to compensate and leads to a shift in the bend of the duct to the intermediate compressor. The nose of the intermediate casing 70 no longer requires a stator as in the existing arrangement as it is now stiffened from the shaft rather than the rotor side. By this arrangement, airframe loads may now be reacted through the powerplant by means of the spider. Also loads can be reacted through the outer carcass 92 without significantly impinging on the core engine 72. The core engine is effectively cantilevered rearwardly from the spider and so is isolated from airframe loads.

The immediate consequence of this is that the engine carcass 92 may now serve as a permanent, load bearing inner skin for the rear fuselage and form part of a semi or quasi-monocoque construction, thereby removing the need for an inner aircraft skin.

Figure 5A:
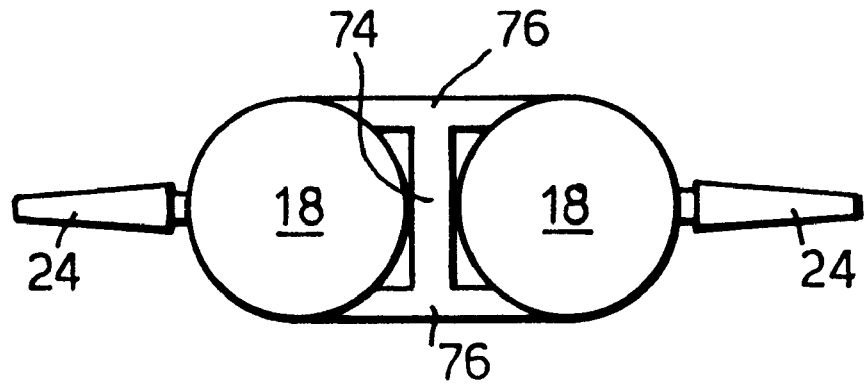
FIGS. 5a and 5b illustrate the overall structural configuration of an embodiment of aircraft in accordance with this invention.
Figure 5B:
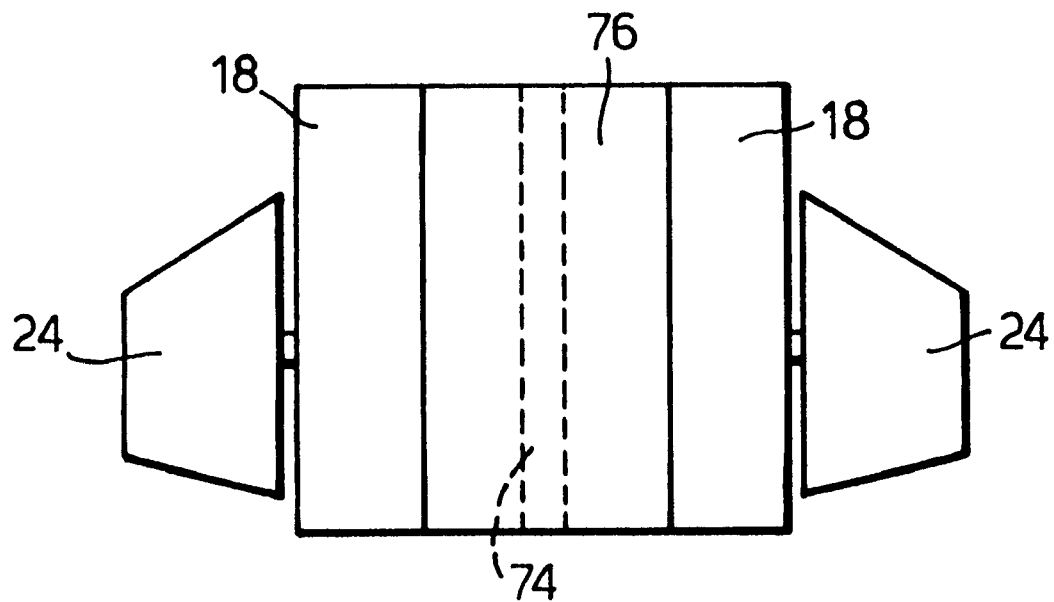

Referring now to FIGS. 5a and b, there is shown a schematic structural view of the rear fuselage of an aircraft with twin powerplants 18, showing the outer casings of the powerplants forming part of the airframe structure. In a preferred feature of this invention, the airframe is further enhanced by incorporation of a longitudinal keel 74 combined with the top and bottom skins 76 of the airframe making up an I beam running down the aircraft centre line. This greatly improves longitudinal bending characteristics and also those in the lateral sense. This provides substantially advanced properties in the air of torsion; the fuselage may be viewed as a multi-celled tube, with its entirety resisting the loading.

Figure 6:
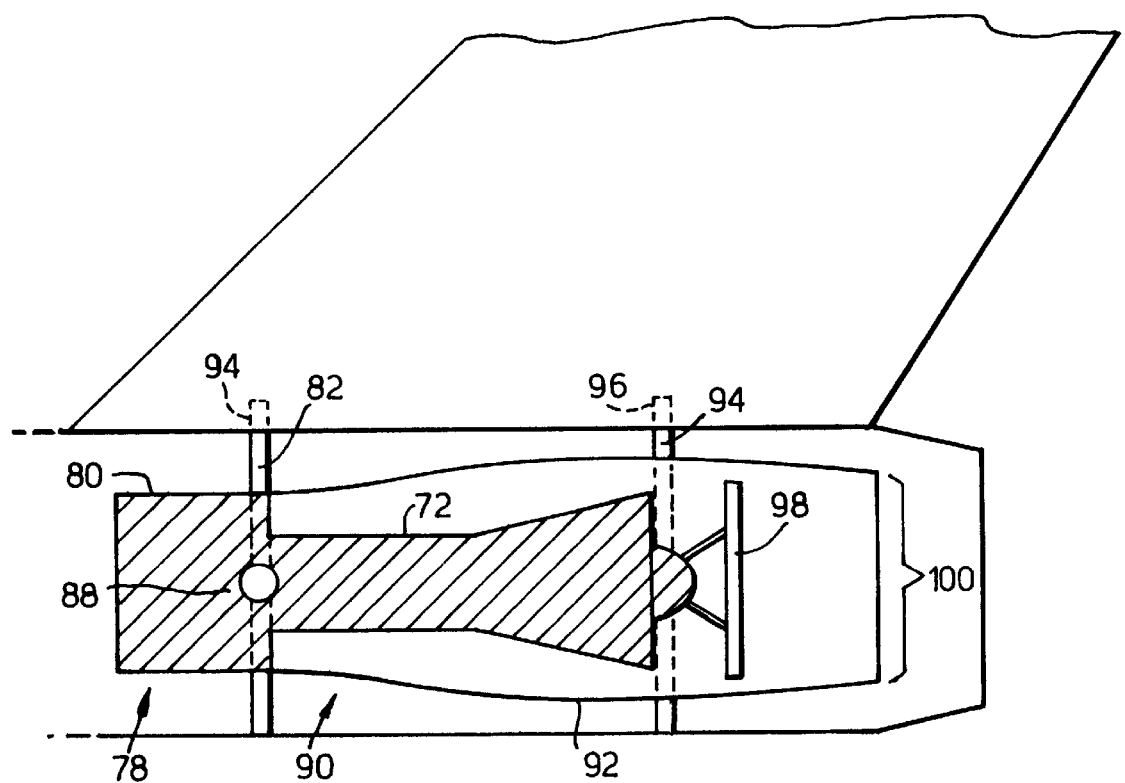
FIG. 6 is a schematic side view of the aft end of an aircraft embodying this invention.

Referring now to FIG. 6, there is shown a schematic side view of the aft end of an aircraft in accordance with this invention and incorporating a further modification to the powerplant whereby the low pressure compressor 78 comprises a cylindrical shroud 80 supporting the stator blades, for ease of withdrawal as to be described below.

Figure 7:
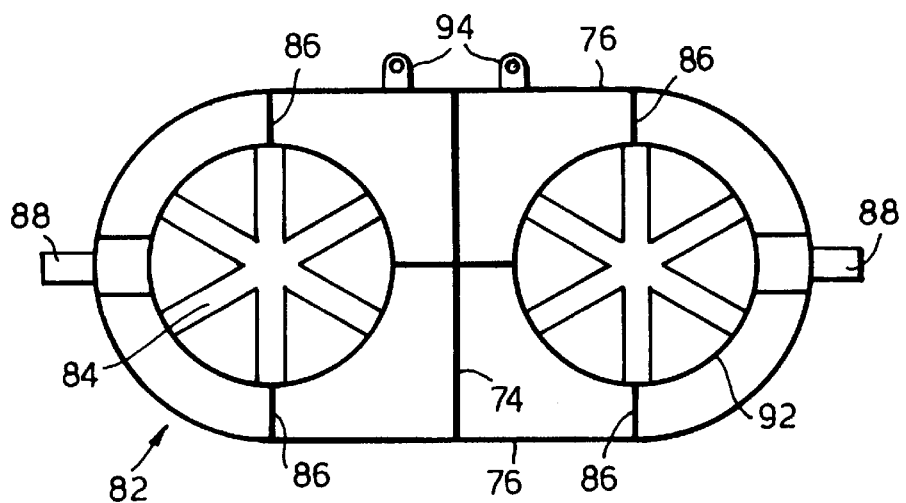
FIG. 7 is a schematic view of a front heavy frame for use in the arrangement or this invention.

FIG. 7 is a schematic view of a front frame 82 as seen in FIG. 6.

The engine 90 is mounted off a large spider which fixes the core engine 72 relative to the airframe and, in this embodiment, comprises a six-legged structure or spider 84 positioned within the large frame. The legs of the spider 84 are of symmetrical aerofoil section. It will be noted that, in this arrangement, the top and bottom longerons 86 introduce the longitudinal bending moment directly into the inner and outer skins. Also, the impact of taileron bending is minimized since deflections introduced through he taileron spigots 88 must travel through 30° of flange before reaching one of the arms of the spider.

Referring to FIG. 6, the engine 90 is shown schematically within the rear fuselage. The carcass 92 of the engine forms part of the airframe and is attached to the outer skin of the aircraft by stringers (not shown) and longerons 86. The spider is connected to the forward "heavy" frame 82 which provides a front fin pick-up at 94 and also a spot 88 for the taileron. A rear heavy frame 94 is secured around the outside of the carcass generally adjacent the outlet of the core engine 72. This frame 94 provides a rear fin pick-up 96. As shown, it is proposed to attached the afterburner guttering to the fairing projecting from the aft end of the core engine.

The front frame 82 is shown in FIG. 7 where it will be seen that the carcass is connected to the outer skin by longerons.

If required, some form of support may be introduced to support the rear of the core, for example by means of a strut between the rear of the core and the engine carcass, but this is by not means essential. It is however greatly preferred that any form of support should not have the effect of transmitting airframe loads into the core engine. A solution would be a smart strut whose structural characteristics were modified in accordance with relative movements of the engine and the airframe.

As noted above, the afterburner system 98 is mounted on the rear of the core and is of a small enough diameter to slide out of the nozzle aperture 100 of the engine. The powerplant is arranged to be removable rearwardly by sliding the core 72 and the low pressure compressor 78 rearwardly through the nozzle 100. This removes the necessity of breaking the rear airframe in any major way, leaving an almost continuous structure.

One of the major implications of this removal technique concerns the front of the engine. It will be noted from FIG. 4 that the first embodiment of this invention includes a waisted profile for the front end of the carcass 92. Both the hub and the carcass have some degree of taper to provide the reduction in area required for compression. This means that it would be impossible to remove the low pressure compressor in this form because it would jam. Accordingly, in this modification the engine carcass 92 is kept parallel to the central axis for the length of the low pressure compressor 78. The reduction in area is performed by the hub alone. This has some implications in terms of a reduction in engine efficiency but considerably simplifies maintenance.

Furthermore, in this improvement, the low pressure compressor stators are mounted on an annulus 80 which is bolted to the surrounding airframe. The annulus then slides out wit the rest of the core engine 72.

In order to reduce the number of connections that need to be broken or made between the core and the airframe on removal of the core 72, the system pipes are run through the arms of the spider to the core.

Referring now to FIG. 8, there is shown schematically the removal of an engine using a maintenance vehicle 102. The engine is removed from the housing by unbolting the spider 68 from the surrounding airframe and also unbolting the annulus 80 which supports the low pressure compressor stator blades. The core engine 72 and associated components may then be slid rearwardly out of the carcass. To assist engine removal longitudinal runners 104 are provided within the engine carcass 92. Due to the direction of translation, some form of machinery may be used, possibly a fork-lift truck.

The spider 68 and low pressure compressor 78 are disconnected from the airframe, and a rod 106 inserted into the aerodynamic fairing behind the low pressure turbine. The engine 90 may then be pulled out of the rear of the aircraft, using a stationary truck 102 and ensuring that the pulling direction is precisely aligned with the runner direction. The truck 102 may further include runners which butt up to those within the carcass. This would prevent the spool shafts of the engine 90 from deforming under the bending moment of the core 72 after the engine had been fully removed.

After core removal, the majority of the aircraft structure remains. This includes the bypass duct, the longerons, frames and external skin. The airframe is therefore in no danger of collapse when the airframes are removed.

It will be noted that the above arrangement integrates the engine carcass into the airframe. This reduces the number of "skins" required and the wasted space.

Figure 9A:
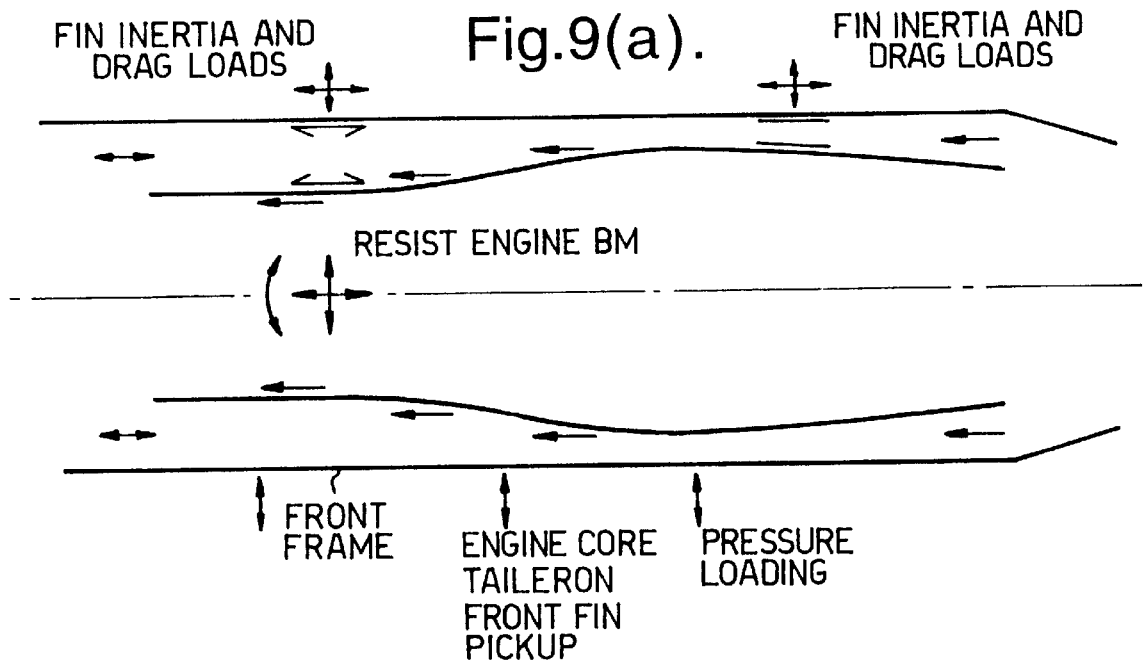
Figure 9B:
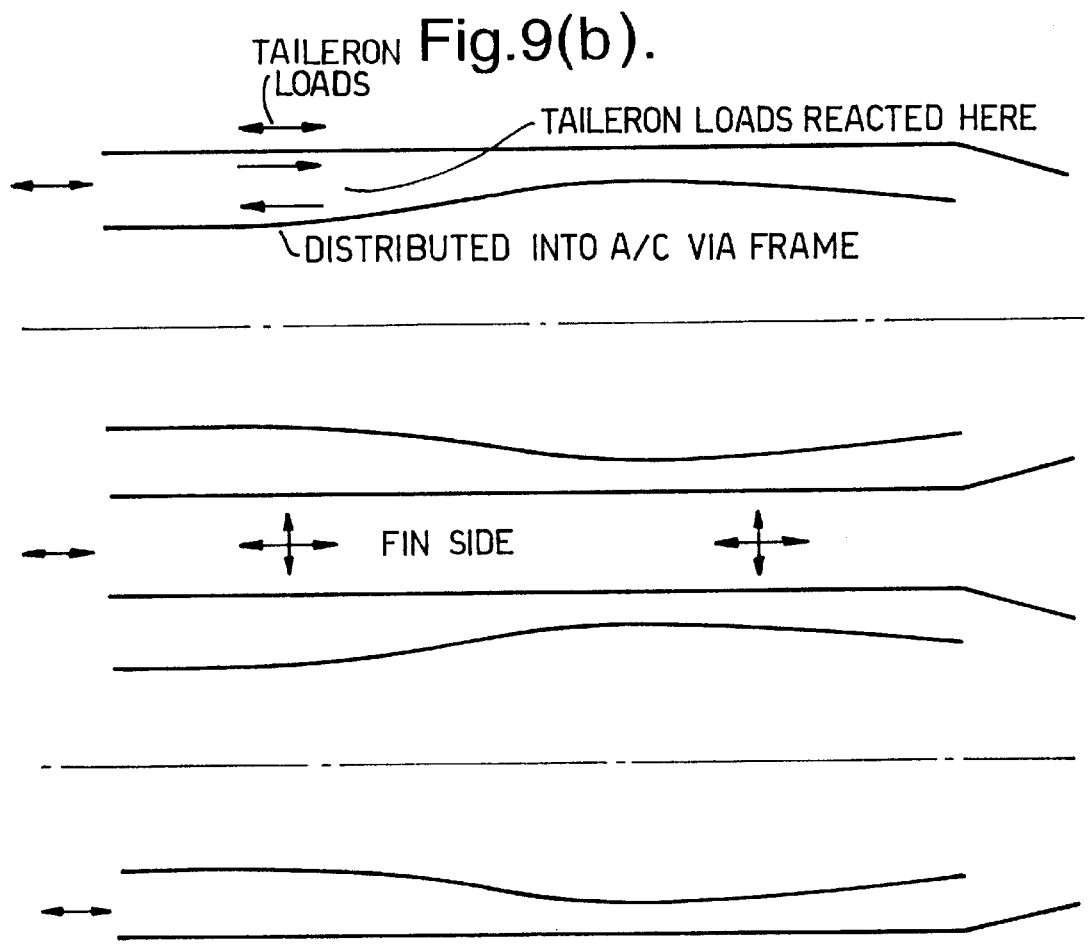

FIGS. 9(*a*) and (*b*) show the load paths in an aircraft of this invention with twin side-by-side powerplants.

What is claimed is:

1. An aircraft incorporating an airframe and a gas turbine engine powerplant wherein the powerplant carries at least some loads of the airframe, said powerplant comprising:
    a core engine;
    an outer carcass, forming a part of said airframe and carrying said at least some of the airframe loads; and
    a mounting support for cantilever mounting of said core engine within said outer carcass, said mounting support carrying all of said core engine mounting loads and insulating said core engine from airframe loads carried by said outer carcass.

2. An aircraft according to claim 1, wherein at least part of the outer structure of the powerplant forms a part of or is integrated into, the airframe of the aircraft.

3. An aircraft according to claim 1, wherein the gas turbine engine powerplant comprises a carcass, and a plurality of compressor stages including a low pressure compressor stage, wherein the carcass and the low pressure compressor stage are subjected to airframe loads.

4. An aircraft according to claim 3, wherein the powerplant includes intermediate casing means surrounding one or more compressor stages downstream of said low pressure compressor stage, and said intermediate casing is substantially isolated from airframe loads.

5. An aircraft according to claim 1 wherein said powerplant includes a structural support for supporting the powerplant, arranged aft of a low pressure compressor stage and forward of an intermediate and/or high pressure compressor stages.

6. An aircraft according to claim 5, which includes a structural frame secured to or integral with said structural support means, and said structural frame supports at least part of the aircraft fin and taileron loads.

7. An aircraft according to claim 1, including an outer skin means rigidly coupled to the carcass at a plurality of locations thereby to define a part of the airframe structure.

8. An aircraft according to claim 1, incorporating two multistage gas turbine powerplants arranged side-by-side, each powerplant including an outer carcass, a structural support adjacent the aft end of a low pressure compressor stage, a forward structural frame interconnecting said structural supports, and rearward structural frame interconnecting adjacent parts of said outer carcasses downstream of said low pressure compressor stage.

9. An aircraft according to claim 8, wherein said forward and rearward structural frame means are further interconnected by one or more longitudinal reinforcing means.

10. An aircraft according to claim 9, wherein said reinforcing means comprises one or more elements making up an elongate member of generally I-section.

11. An aircraft according to claim 1 wherein the carcass, core engine and low pressure compressor stage are designed so that the core engine and low pressure compressor stage may be withdrawn as a unit longitudinally from the carcass.

12. An aircraft according to claim 11, wherein the inner profile of the carcass adjacent the low pressure compressor is generally cylindrical.

13. An aircraft according to claim 12, wherein stator blades of the low pressure compressor stage are mounted on an annulus means removably attached to the airframe.

14. An aircraft incorporating a gas turbine engine powerplant wherein at least part of the powerplant forms a part of, or is integrated into, the airframe of the aircraft, wherein the airframe structure adjacent the powerplant includes longitudinal guide means for assisting longitudinal withdrawal of at least part of the powerplant.

* * * * *